US010362368B1

(12) United States Patent
Goetz et al.

(10) Patent No.: US 10,362,368 B1
(45) Date of Patent: Jul. 23, 2019

(54) INFERRING ENTITY INFORMATION IN MEDIA CONTENT

(71) Applicant: Amazon Technologies, Inc., Seattle, WA (US)

(72) Inventors: Jeromey Russell Goetz, Seattle, WA (US); Adam Carlson, Seattle, WA (US); Douglas Andrew Hungarter, Seattle, WA (US); Carolin Jessel, Seattle, WA (US); Alexandria Way-Wun Kravis, Seattle, WA (US); Brandon Scott Love, Seattle, WA (US); Steven Matthew Pyke, Seattle, WA (US); Danny Ryan Stephens, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 367 days.

(21) Appl. No.: 14/641,210

(22) Filed: Mar. 6, 2015

(51) Int. Cl.
*H04N 21/81* (2011.01)
*H04N 21/234* (2011.01)
*H04N 21/235* (2011.01)

(52) U.S. Cl.
CPC ..... *H04N 21/8133* (2013.01); *H04N 21/2353* (2013.01); *H04N 21/23418* (2013.01)

(58) Field of Classification Search
CPC ........... H04N 21/2353; H04N 21/2665; H04N 21/435; H04N 21/44008; H04N 21/8133; H04N 21/84; H04N 21/235; H04W 4/206; G06F 17/21; G06F 3/0481
See application file for complete search history.

(56) References Cited

U.S. PATENT DOCUMENTS 7,233,950 B2 * 6/2007 Smith, III ......... G06F 17/30855
9,128,581 B1 * 9/2015 Goodspeed ........... G06F 3/0841
9,304,992 B2 * 4/2016 Gudmundsson .. G06F 17/30011
(Continued)

FOREIGN PATENT DOCUMENTS

CN        102567463 A  *  7/2012

OTHER PUBLICATIONS

Yeh et al. (Yeh, Mei-Chen et al. "Automatic Social Network Construction from Movies Using Film-Editing Cues", IEEE International Conference on Multimedia and Expo Workshops, 2012).*
(Continued)

*Primary Examiner* — Benjamin R Bruckart
*Assistant Examiner* — Anthony Bantamoi
(74) *Attorney, Agent, or Firm* — Thomas Horstemeyer, LLP

(57) ABSTRACT

Relationships and descriptions are inferred for entities that appear in media content, such as movies and television programs. In one embodiment, media content is analyzed to infer relationships among entities that appear in the media content over an entirety of the media content. Relationships between two or more entities may change over time in the media content. A request is received from a client device for entity information regarding one or more entities relative to a particular time in the media content. Relationships that have been inferred via this analysis are then identified based at least in part on the particular time. The entity information presenting the identified relationships is sent to the client device.

20 Claims, 7 Drawing Sheets

(56) References Cited

U.S. PATENT DOCUMENTS

| | | | | |
|---|---|---|---|---|
| 9,471,547 | B1* | 10/2016 | Goodspeed | G06F 17/21 |
| 2006/0271594 | A1* | 11/2006 | Haberman | G06F 17/30817 |
| 2012/0079372 | A1* | 3/2012 | Kandekar | G06F 17/2745 |
| | | | | 715/256 |
| 2012/0158706 | A1* | 6/2012 | Story, Jr. | G06F 17/3005 |
| | | | | 707/723 |
| 2012/0210203 | A1* | 8/2012 | Kandekar | G06F 17/30719 |
| | | | | 715/230 |
| 2015/0026728 | A1* | 1/2015 | Carter | H04N 21/235 |
| | | | | 725/42 |
| 2015/0095938 | A1* | 4/2015 | Xiong | H04N 21/4622 |
| | | | | 725/32 |
| 2015/0163550 | A1* | 6/2015 | Tyndall | H04N 21/4756 |
| | | | | 725/13 |
| 2015/0348157 | A1* | 12/2015 | Garcia | G06Q 30/0625 |
| | | | | 705/26.62 |
| 2016/0064032 | A1* | 3/2016 | Issa | H04N 5/783 |
| | | | | 386/351 |
| 2016/0212485 | A1* | 7/2016 | Fahlander | G06F 17/30823 |

OTHER PUBLICATIONS

Karadoğan et al. (Karadoğan, Seliz Gulsen and Jan Larsen, "Combining Semantic and Acoustic Features for Valence and Arousal Recognition in Speech", 2012 3rd International Workshop on Cognitive Information Processing (CIP), 2012.).*

* cited by examiner

US 10,362,368 B1

INFERRING ENTITY INFORMATION IN MEDIA CONTENT

BACKGROUND

Media content, such as movies, television programs, and so on, may feature a number of characters. Two or more characters may be related to one another by many different types of relationships. For example, two characters may be parent and child, siblings, employer and employee, roommates, best friends, partners in crime, or have other types of relationships. Viewers typically learn of these relationships in watching the media content.

BRIEF DESCRIPTION OF THE DRAWINGS

Many aspects of the present disclosure can be better understood with reference to the following drawings. The components in the drawings are not necessarily to scale, with emphasis instead being placed upon clearly illustrating the principles of the disclosure. Moreover, in the drawings, like reference numerals designate corresponding parts throughout the several views.

DETAILED DESCRIPTION

Figure 1A:
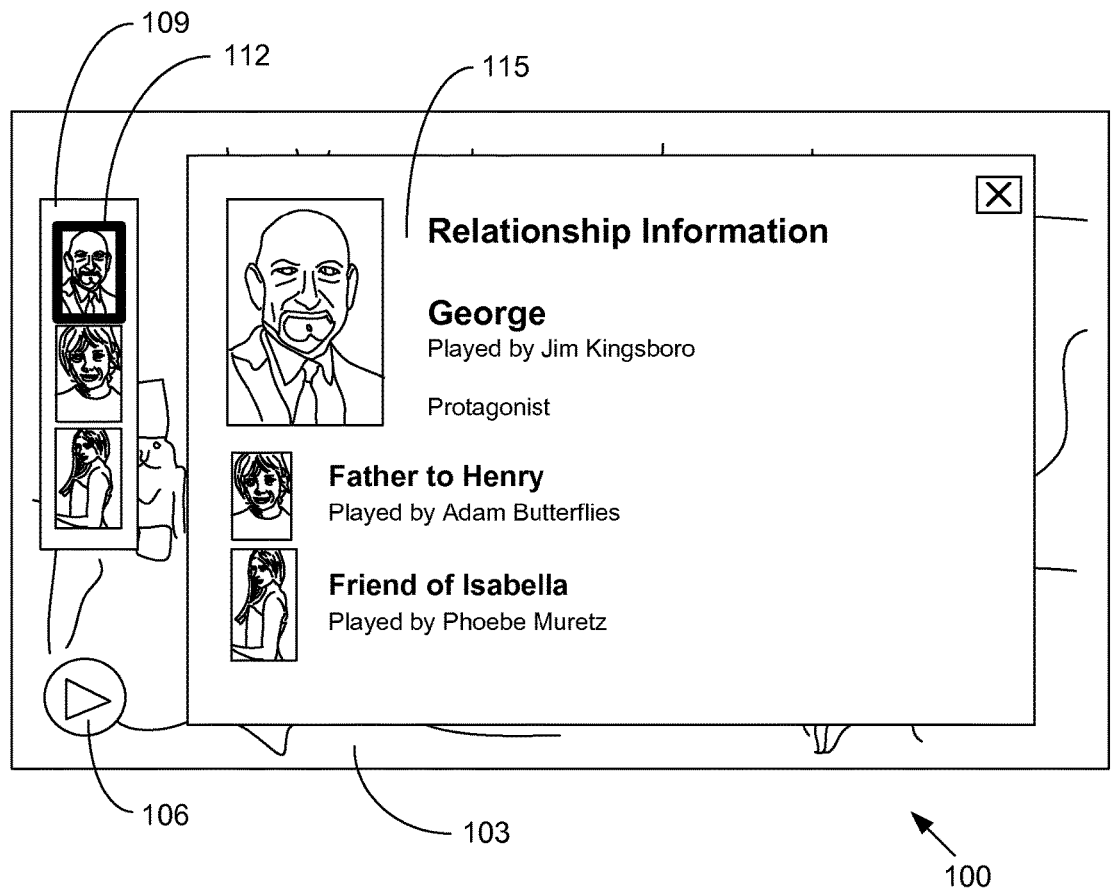
FIGS. 1A and 1B are drawings of example user interfaces rendered by a client device according to various embodiments of the present disclosure.

The present disclosure relates to inferring information about characters and other entities that appear in media content. Such information may include relationships with other entities and descriptions about the entities. Characters in media content may be related to one another in a variety of ways. Two characters may, for example, be parent and child, brother and sister, co-workers, partners in crime, or have other types of relationships. Also, a character may be related to others by fulfilling a certain role in the story (e.g., protagonist or hero, antagonist or villain, etc.). The relationships among the characters may be interesting information to consumers of the media content, but typical sources of metadata for the media content may not include such relationships. For example, metadata associated with a movie may identify the different characters in the movie, along with the cast members who play the roles, but the metadata may not explain that characters "Joe" and "Bob" are actually co-workers.

In addition, entities that are not characters may have relationships with characters and/or other entities within the storyline of media content. Entities may include physical objects (e.g., a gun, a shoe, a dress, etc.) and locations (e.g., a coffee shop, an office, etc.). For example, a particular character may be associated with a particular dress, or a group of characters may often meet at a certain coffee shop. The entities may be named or unnamed.

Various embodiments of the present disclosure provide approaches for inferring entity relationships and descriptions by analyzing the media content and potentially metadata associated with the media content. Analyses may be performed upon character dialogues, frequency of entity appearance, whether entities appear together in a scene, visual and aural characteristics of scenes in which the entities appear, and so on. The resulting inferred relationships may be subject to manual confirmation in some embodiments. Ultimately, information about the inferred relationships may be presented to media consumers who are seeking additional information about specific characters. Further, descriptions of entities may be inferred through this analysis (e.g., the character "Joe" may be described as a "villain.").

It is noted that entity descriptions and relationships among entities may change over time. For instance, characters "Joe" and "Annie" may be married in the first season of a television series, but "Joe" may die as a result of an event in the middle of the second season, thereby changing the relationship between the two. In another example, a character "Walter" may be described as "a teacher with cancer" in a first episode of a television series, "a small time drug dealer" by the fifth episode, "a dangerous drug dealer and murderer" by episode fifty, and "a drug kingpin" by episode two-hundred. Various embodiments of the present disclosure may contemplate the evolution of relationships and descriptions over time, and inferred relationships and descriptions may be presented based at least in part on a particular time in the media content. That is to say, for a particular time, only the portion of the media content that precedes the particular time may be taken into account in inferring the relationships and descriptions. Such functionality may be used to avoid plot "spoilers," such as presenting to the viewer during season one the fact that "Joe" dies in season two.

Referring now to FIG. 1A, shown is one example of a user interface 100 rendered by a client device in accordance with various embodiments. The user interface 100 corresponds to a media player that is currently rendering media content 103. The media player may have various playback controls, such as a play button 106. In this example, the playback of the media content 103 is stopped at a particular time in the media content 103. A character selection component 109 is rendered in the user interface 100 and facilitates a selection of a character 112. In one embodiment, the character selection component 109 is configured to show all characters 112 in the current scene or all characters 112 in the media content 103.

In response to the selection of the character 112, a character information component 115 is rendered on the user interface 100. Although the character information component 115 is shown as obscuring a portion of the media content 103, it is understood that in some embodiments, the character information component 115 may be rendered on a different display or by a different client device as compared to the media content 103. The character information component 115 provides information about the relationships of the character 112 to other characters 112 in the media content 103.

In this specific non-limiting example, the character 112 is identified as "George" and is played by a cast member named "Jim Kingsboro." As a result of the analysis that will be described, "George" is identified as the protagonist of the movie and also as the "Father to Henry," another character 112 who is played by "Adam Butterflies," and as a "Friend of Isabella," another character 112 who is played by "Phoebe Muretz." The relationship information shown in the character information component 115 may be based solely on analysis of the media content 103 up to the current scene or time in the media content 103. Thus, what is shown in the character information component 115 about a given character 112 may be updated as time progresses in the media content 103. Although much of the content of the character information component 115 may be automatically generated data as a result of the analysis, potentially subject to manual confirmation, the character information component 115 may also include curated data provided by editors. In the following discussion, a general description of the system and its components is provided, followed by a discussion of the operation of the same.

Figure 1B:
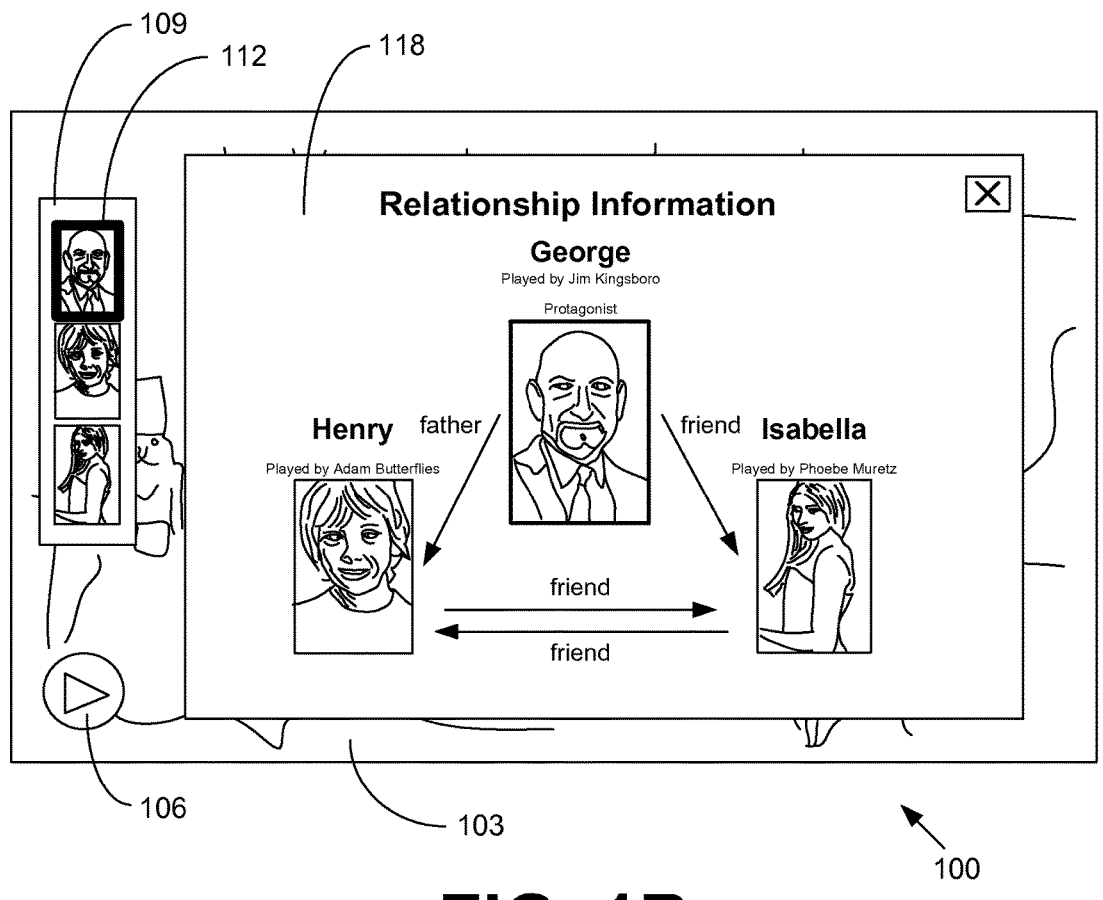

Moving on to FIG. 1B, shown is another example of a user interface 100 rendered by a client device in accordance with various embodiments. As compared to FIG. 1A, character information component 118 is rendered in place of character information component 115 (FIG. 1A). The character information component 118 provides a relationship web view that visually represents the relationships among the characters 112. Relationships may be bidirectional or unidirectional. For example, George may be the father to Henry, while Henry is the son of George, and these are examples of unidirectional relationships. By contrast, Henry and Isabella may be friends with each other, an example of a bidirectional relationship. Additional detail may be shown in the character information component 118 in some embodiments. For example, selecting a particular character 112 may cause the character information component 118 to be updated with all of the relationships centering about that selected character 112.

It is noted that relationship mappings may be character-centric or cast-member centric in different embodiments. For example, a given character 112 may be played by different actors in different seasons. The relationships that are inferred and presented may pertain to the character 112 as played for all of the different actors (character-centric). Alternatively, the relationships may pertain to the character 112 as played by a single selected actor of the multiple different actors.

Figure 2:
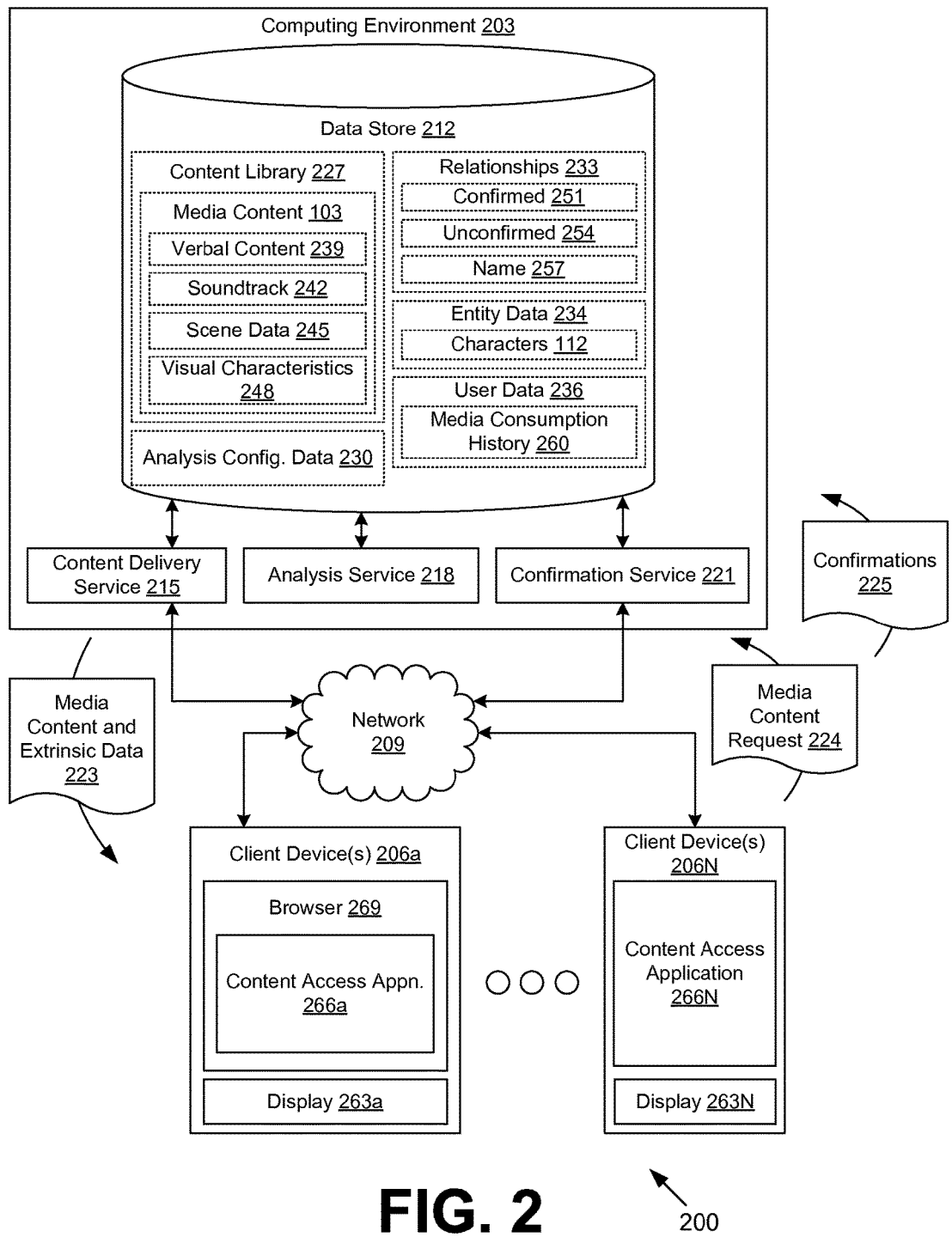
FIG. 2 is a schematic block diagram of a networked environment according to various embodiments of the present disclosure.

With reference to FIG. 2, shown is a networked environment 200 according to various embodiments. The networked environment 200 includes a computing environment 203 and a plurality of clients 206a . . . 206N, which are in data communication via a network 209. The network 209 includes, for example, the Internet, intranets, extranets, wide area networks (WANs), local area networks (LANs), wired networks, wireless networks, cable networks, satellite networks, or other suitable networks, etc., or any combination of two or more such networks.

The computing environment 203 may comprise, for example, a server computer or any other system providing computing capability. Alternatively, the computing environment 203 may employ a plurality of computing devices that may be arranged, for example, in one or more server banks, computer banks, or other arrangements. Such computing devices may be located in a single installation or may be distributed among many different geographical locations. For example, the computing environment 203 may include a plurality of computing devices that together may comprise a hosted computing resource, a grid computing resource, and/or any other distributed computing arrangement. In some cases, the computing environment 203 may correspond to an elastic computing resource where the allotted capacity of processing, network, storage, or other computing-related resources may vary over time.

Various applications and/or other functionality may be executed in the computing environment 203 according to various embodiments. Also, various data is stored in a data store 212 that is accessible to the computing environment 203. The data store 212 may be representative of a plurality of data stores 212 as can be appreciated. The data stored in the data store 212, for example, is associated with the operation of the various applications and/or functional entities described below.

The components executed on the computing environment 203, for example, include a content delivery service 215, an analysis service 218, a confirmation service 221, and other applications, services, processes, systems, engines, or functionality not discussed in detail herein. The content delivery service 215 is executed to serve up or stream media content 103 to client devices 206. The media content 103 may include video content, audio content, electronic book content, and/or any other digital content that includes a storyline having multiple characters. The storyline may be fictional or non-fictional (e.g., non-fictional in the case of a reality television program). The content delivery service 215 may support a resume functionality such that playback of media content 103 may be stopped at a point in the media content 103 on one device and later resumed at that point on the same device or a different device. The content delivery service 215 may be configured to send extrinsic data to the client devices 206 accompanying the media content 103. To this end, the content delivery service 215 sends the media content and extrinsic data 223 to the client devices 206 in response to media content requests 224.

The analysis service 218 is executed to generate entity descriptions and relationships between entities who appear in the media content 103. In this regard, the analysis service 218 performs an analysis on the media content 103, including potentially metadata and/or extrinsic data that accompanies the media content 103. An object of the analysis service 218 may be to automate the determination of these relationships and descriptions to provide detailed character information. The analysis service 218 may use approaches from machine learning, graph theory, clustering, social network analysis, sentiment analysis, natural language processing, and/or other approaches to infer relationships among characters.

The confirmation service 221 may be executed in some embodiments to obtain manual confirmations 225 as to the inferred relationships and descriptions identified by the analysis service 218. The confirmation service 221 may crowdsource the confirmations 225 from potentially many different users. Alternatively, the confirmation service 221 may utilize agents to perform the confirmation 225, where the agents may be compensated, for example, on a per-task basis. In some cases, the analysis service 218 may identify the outlines of a relationship between two characters, while the confirmation service 221 may receive a verbal or textual description of the relationship from one or more users.

The data stored in the data store 212 includes, for example, a content library 227, analysis configuration data 230, relationships 233, entity data 234, user data 236, and potentially other data. The content library 227 includes a plurality of features of media content 103 that are available to users via the content delivery service 215. The media content 103 may correspond to video content (e.g., movies, television programs, etc.), audio content (e.g., audio books, radio dramas, etc.), book content, and/or any other digital content that has characters 112. It is noted that features of media content 103 may be related to other features, such as an episode in a series, sequels, prequels, and so on.

A feature of media content 103 may be associated with various data embodied within the media content 103, generated from the media content 103, or otherwise supplied alongside the media content 103 as extrinsic data. Such data may include verbal content 239, audio content 242, scene data 245, visual characteristics 248, and so on. The verbal content 239 may correspond to words stated by characters 112 in the media content 103 such as dialogues, monologues, narrations, and so on. The verbal content 239, in one embodiment, may correspond to closed captioning data. The audio content 242 corresponds to aural content that accompanies the media content 103. In this regard, the audio content 242 may include music, sound effects, ambient noise, speech, and other aural content.

The scene data 245 divides the media content 103 into a plurality of scenes and indicates which entities appear in each of the scenes, whether they appear together on screen, and/or other characteristics. The scenes may correspond to natural breaks in the media content 103, which may involve different background locations, different settings, different filming styles, and so on. The visual characteristics 248 may be determined through processing video corresponding to the media content 103. Visual characteristics 248 may include, for example, locations of the corresponding scene, brightness, contrast, color information, and so on. In some embodiments, the visual characteristics 248 may define a "mood" of the corresponding scene in the media content 103. The media content 103 may be associated with director's notes, staging information, and potentially other data (e.g., plot synopses) obtained from third-party providers, which may also be used in the analysis by the analysis service 218.

The analysis configuration data 230 includes data that configures the operation of the analysis service 218. Such data may comprise machine learning models, graphs, configuration parameters, keywords for natural language processing, and other configuration data. The analysis configuration data 230 may also control under what situations that the relationships 233 identified by the analysis service 218 will require confirmation via the confirmation service 221.

The relationships 233 correspond to the relationships among characters 112 and other entities within media content 103. Such relationships 233 define a connection between two or more entities or a description that is a connection to all entities in a general sense (e.g., a villain). The relationships 233 may have a beginning and an end and/or may evolve over time in the media content 103 or across multiple features of media content 103 that share the same entities. In this regard, the relationships 233 may be indexed according to times or scenes within the media content 103 so that, for a given time or scene in the media content 103, the relationships 233 determined only with respect to the media content 103 thus far may be considered.

The relationships 233 may be categorized into those that have been confirmed 251 via the confirmation service 221 and those that are unconfirmed 254. Each relationship 233 may be associated with a respective name 257 that may be determined automatically or specified by a user via the confirmation service 221.

The entity data 234 may describe various named and unnamed entities that appear in the media content 103. For example, the entities may include characters 112, locations, and objects. The characters 112 correspond to character elements that appear in the media content 103. In the case of non-book content, characters 112 may be visually and/or vocally performed by human actors/actresses (i.e., cast members) or may be computer-generated. Depending on the storyline of the content, the characters 112 may correspond to people or creatures.

The user data 236 describes a plurality of users who may be able to access media content 103 via the content delivery service 215 and/or may be able to provide confirmations 225 via the confirmation service 221. In particular, the user data 236 may include a media consumption history 260 for each user, indicating which features of media content 103 that the respective user has consumed. Other user data 236 may include reviews and ratings of media content 103, reliability of past confirmations 225, and/or other data. The user data 236 may be employed to qualify users for participating in the relationship confirmation process.

Each client device 206a . . . 206N may comprise, for example, a processor-based system such as a computer system. Such a computer system may be embodied in the form of a desktop computer, a laptop computer, personal digital assistants, cellular telephones, smartphones, set-top boxes, music players, web pads, tablet computer systems, game consoles, electronic book readers, or other devices. Each client device 206a . . . 206N may include a respective display 263a . . . 263N. The display 263a . . . 263N may comprise, for example, one or more devices such as liquid crystal display (LCD) displays, gas plasma-based flat panel displays, organic light emitting diode (OLED) displays, electrophoretic ink (E ink) displays, LCD projectors, or other types of display devices, etc.

Each client device 206a . . . 206N may be configured to execute various applications such as a content access application 266a . . . 266N, a browser 269, and/or other applications. The content access application 266 is executed to send a media content request 224 to the content delivery service 215 and to receive media content and extrinsic data 223 in return. From the media content and extrinsic data 223, the content access application 266 is configured to render the media content 103. In addition, the content access application 266 may render user interfaces 100 (FIG. 1A) that facilitate control of the rendering of the media content 103 as well as present additional information about the media content 103 from the extrinsic data. In some embodiments, the content access application 266 may be configured to render a user interface that facilitates submitting confirmations 225 of relationships 233 to the confirmation service 221.

The content access application 226 may be a standalone application or may function in a browser 269 as a plug-in or other code executable by the browser 269. The client device 206a . . . 206N may be configured to execute applications beyond the content access application 266a . . . 266N and the browser 269 such as, for example, email applications, social networking applications, word processors, spreadsheets, and/or other applications.

Next, a general description of the operation of the various components of the networked environment 200 is provided. To begin, media content 103 is analyzed by the analysis service 218 to generate tentative relationships 233. The tentative relationships 233 may then be presented to users for manual confirmation via the confirmation service 221. The relationships 233 are then stored in the data store 212 indexed to time in the media content 103.

When a user consumes media content 103 via the content delivery service 215, the user may request information about a given entity. Alternatively, information about a given entity may be surfaced automatically in connection with the rendering of the media content 103 by the client device 206. The content delivery service 215 sends entity information, including relationships 233 associated with the entity to the client device 206 via the network 209 based at least in part on the current time or position in the media content 103 so as not to create spoilers.

Several examples of the types of analysis performed by the analysis service 218 will next be discussed. To begin with, the analysis service 218 may examine how often entities appear in episodes of media content 103 and scenes within the media content 103. The analysis service 218 may use this frequency of appearance information to infer a general relationship 233 as compared to all other entities (e.g., is this character 112 a main character, a supporting character, a guest star, a recurring character, a villain of the week, etc.).

The analysis service 218 may also use scene data 245 to determine how often particular entities appear in scenes together. This can be used to build a "social graph" that presents the important relationships 233 among the entities. The sudden disappearance of a main or supporting character 112 from media content 103 in subsequent episodes may indicate that the character 112 has been written out of the media content 103 (e.g., went on a long trip, has amnesia, has been killed off, etc.). If two characters 112 typically appear in scenes together, but then start appearing in separate scenes, a break in the relationship 233 may be inferred. Such an inference may not be determinative, as the writers may simply be spending time developing the characters 112 more. In some cases, if characters 112 appear at a same location (e.g., a particular office) even if they are not in the scene together, a relationship 233 may be implied (e.g., they are co-workers at the office).

The analysis service 218 may use verbal content 239 to infer relationships 233 among entities who mention each other's names. For example, in a movie, a character 112 may mention his boss many times, but may appear only in one or two scenes with him or her. This might imply a more formal relationship (e.g., boss and subordinate), as compared to a character 112 who mentions his wife many times or a police officer who mentions a partner many times. Sentiment analysis may also be performed on the verbal content 239 to determine whether characters 112 are friendly, loving, formal, or unhappy with another character 112, particularly if there is a repeated pattern over several scenes throughout a series of media content 103. Natural language processing upon the verbal content 239 may be used to determine whether characters 112 refer to each other by terms that indicate a relationship 233 (e.g., "you're my brother").

Audio analysis upon the audio content 242 may determine whether there are raised voices, loud noises, gunshots, slamming doors, etc. to indicate the relationship 233 that might exist between characters 112. For example, members of a gang might frequently be involved in scenes having gun play. The type of music associated with a character 112 in a scene might also hint at the relationships 233 of the character 112. For example, a character 112 always accompanied by ominous music may be the villain. Visual characteristics 248, including the moods of scenes, may also hint at relationships 233. Characters 112 who appear in dark scenes may be relatively evil or dangerous. If one character 112 is determined to have a certain characteristic (e.g., villain), other characters 112 who frequently talk with that character 112 may be associated with the characteristic by implication.

Figure 3:
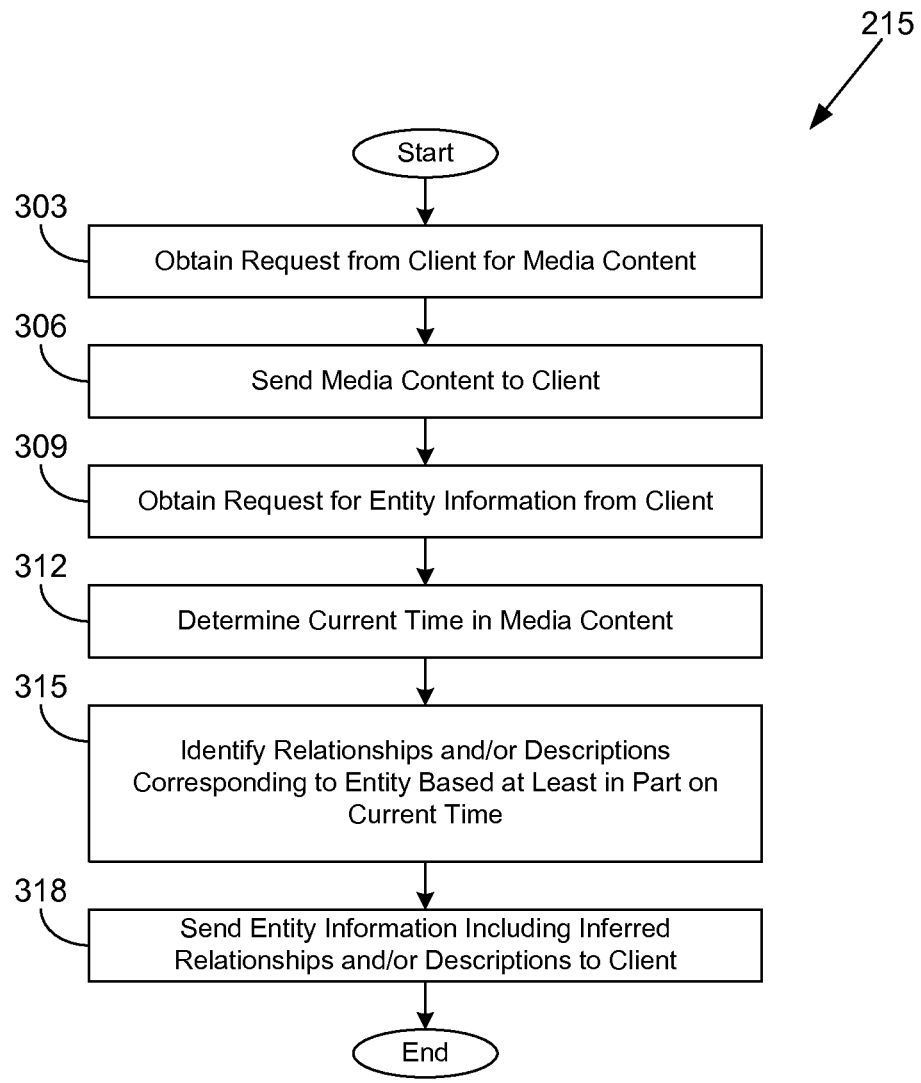
FIG. 3 is a flowchart illustrating one example of functionality implemented as portions of a content delivery service executed in a computing environment in the networked environment of FIG. 2 according to various embodiments of the present disclosure.

Referring next to FIG. 3, shown is a flowchart that provides one example of the operation of a portion of the content delivery service 215 according to various embodiments. It is understood that the flowchart of FIG. 3 provides merely an example of the many different types of functional arrangements that may be employed to implement the operation of the portion of the content delivery service 215 as described herein. As an alternative, the flowchart of FIG. 3 may be viewed as depicting an example of elements of a method implemented in the computing environment 203 (FIG. 2) according to one or more embodiments.

Beginning with box 303, the content delivery service 215 obtains a media content request 224 (FIG. 2) for media content 103 (FIG. 2) from a content access application 266 (FIG. 2) executed in a client device 206 (FIG. 2). In box 306, the content delivery service 215, upon verifying that the client device 206 has the right to access the media content 103, sends the media content 103 to the client device 206 by way of the network 209 (FIG. 2).

In box 309, the content delivery service 215 obtains a request for entity information from a client device 206 regarding a character 112 (FIG. 2) or another entity. In box 312, the content delivery service 215 determines a current time (or scene) in the media content 103 as being presented by the client device 206. In some cases, the content delivery service 215 may determine the relative position of the media content 103 within a series of the media content 103. In box 315, the content delivery service 215 identifies one or more inferred relationships 233 (FIG. 2) and/or descriptions corresponding to the entity based at least in part on the current time or scene in the media content 103.

In box 318, the content delivery service 215 sends the entity information including the identified relationships 233 and/or descriptions to the client device 206 for presentation. For example, the client device 206 may present the relationships 233 to the user by rendering a user interface similar to that of user interface 100 (FIG. 1A). Thereafter, the operation of the portion of the content delivery service 215 ends.

Figure 4:
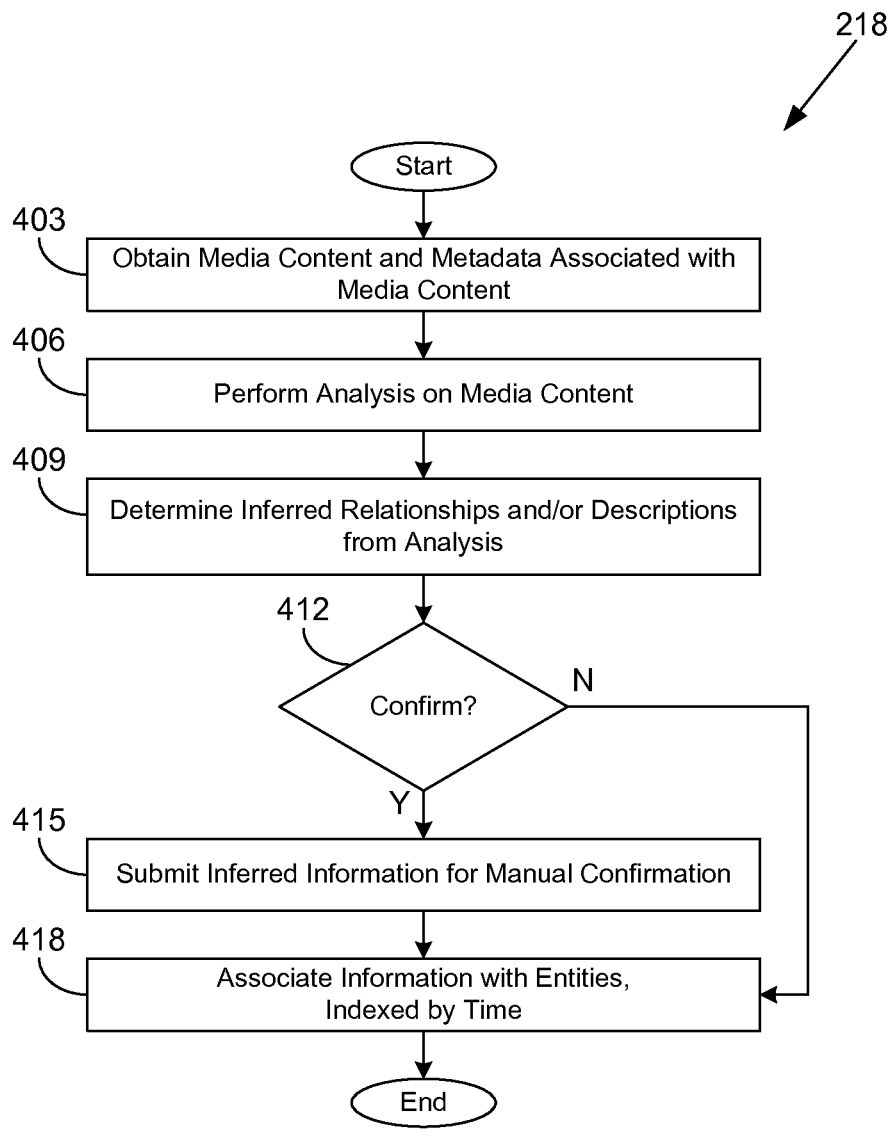
FIG. 4 is a flowchart illustrating one example of functionality implemented as portions of a relationship analysis service executed in a computing environment in the networked environment of FIG. 2 according to various embodiments of the present disclosure.

Turning now to FIG. 4, shown is a flowchart that provides one example of the operation of a portion of the analysis service 218 according to various embodiments. It is understood that the flowchart of FIG. 4 provides merely an example of the many different types of functional arrangements that may be employed to implement the operation of the portion of the analysis service 218 as described herein. As an alternative, the flowchart of FIG. 4 may be viewed as depicting an example of elements of a method implemented in the computing environment 203 (FIG. 2) according to one or more embodiments.

Beginning with box 403, the analysis service 218 obtains media content 103 (FIG. 2) and potentially metadata associated with the media content 103. In box 406, the analysis service 218 performs an analysis upon the media content 103 using a set of characters 112 (FIG. 2) and/or other entities that appear in the media content 103. The analysis may involve a variety of analysis approaches, including social network relationship analysis, machine learning, sentiment analysis, natural language processing, and so on. The analysis may be performed using, for example, the verbal content 239 (FIG. 2), the audio content 242 (FIG. 2), the scene data 245 (FIG. 2), the visual characteristics 248 (FIG. 2), and other data. The analysis may be configured via the analysis configuration data 230 (FIG. 2).

In box 409, the analysis service 218 determines inferred relationships 233 (FIG. 2) and/or descriptions for the characters 112 and/or other entities. The determination may be a weighted combination of multiple factors, thereby producing a confidence score as to the degree of confidence in the accuracy of the inferred relationship 233 or description. In box 412, the analysis service 218 determines whether to obtain a manual confirmation 225 (FIG. 2) of the inferred relationship 233 or description. Such a determination may involve comparing a respective confidence score with a threshold.

If a manual confirmation 225 is to be obtained, the analysis service 218 moves from box 412 to box 415 and submits the inferred relationships 233 or descriptions for confirmation via the confirmation service 221 (FIG. 2). The analysis service 218 continues to box 418. If a manual confirmation 225 is not to be obtained, the analysis service 218 proceeds directly from box 412 to box 418.

In box 418, the analysis service 218 associates the inferred relationships 233 and/or descriptions with the characters 112 or other entities to which they pertain. The relationships 233 may be indexed by time or scene in the media content 103, and the relationships 233 may change or evolve over time in the media content 103 or in a series of media content 103. Thereafter, the operation of the analysis service 218 ends.

Figure 5:
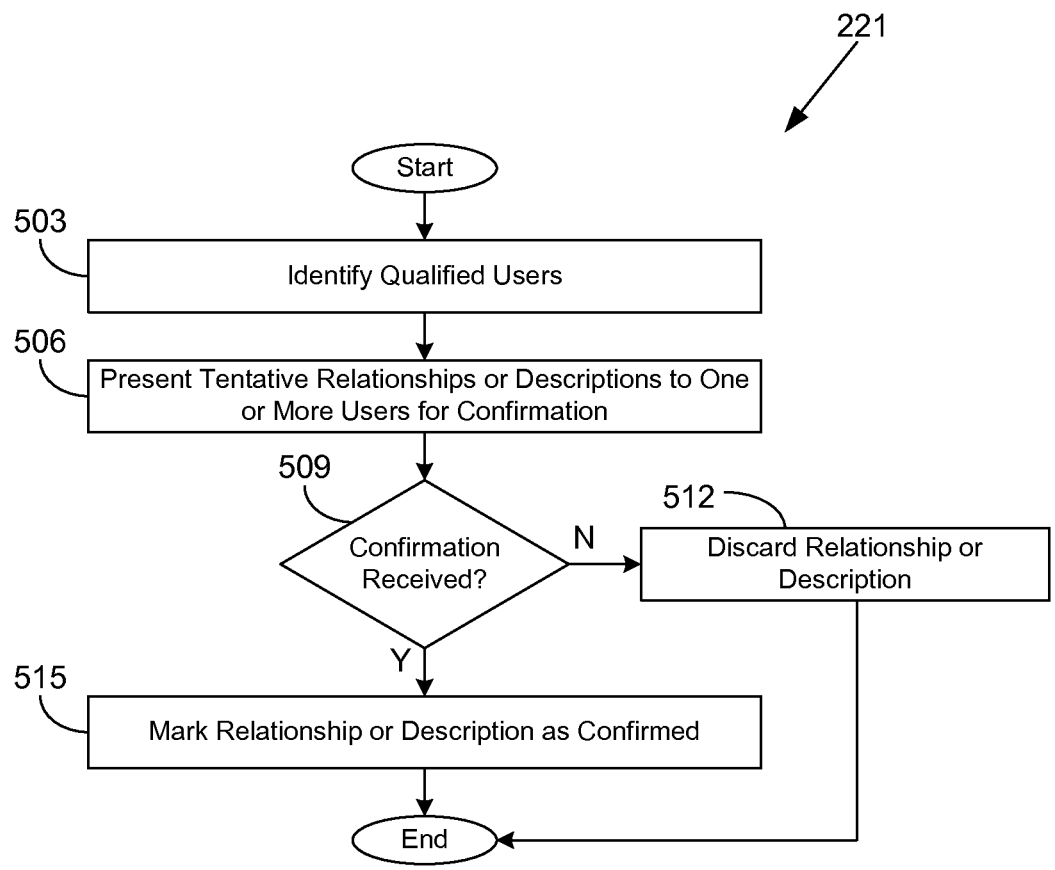
FIG. 5 is a flowchart illustrating one example of functionality implemented as portions of a relationship confirmation service executed in a computing environment in the networked environment of FIG. 2 according to various embodiments of the present disclosure.

Moving on to FIG. 5, shown is a flowchart that provides one example of the operation of a portion of the confirmation service 221 according to various embodiments. It is understood that the flowchart of FIG. 5 provides merely an example of the many different types of functional arrangements that may be employed to implement the operation of the portion of the confirmation service 221 as described herein. As an alternative, the flowchart of FIG. 5 may be viewed as depicting an example of elements of a method implemented in the computing environment 203 (FIG. 2) according to one or more embodiments.

Beginning with box 503, the confirmation service 221 identifies qualified users for evaluating relationships 233 (FIG. 2) or descriptions inferred for certain media content 103. For example, the confirmation service 221 may be configured to select only users who have demonstrated a high level of knowledge in regard to a particular type or series of media content 103, users who have watched the entirety of the media content 103 according to their media consumption history 260 (FIG. 2), users who have written reviews of the media content 103, users who have watched the media content 103 within a recent window of time, users have previously submitted manual confirmations 225 (FIG. 2) that have been determined to be correct, users who have commented about the media content 103 in social media, and/or according to other criteria.

In box 506, once the qualified users are identified, the confirmation service 221 presents one or more tentative relationships 233 or descriptions to one or more users for confirmation. As a non-limiting example, a user interface 100 (FIG. 1A) may render a question: "Is George the father of Henry?" A yes or no answer may be elicited. Alternatively, the user may be presented with several possible options, for example: "What relationship is George to Henry? A. Father, B. Grandfather, or C. Uncle."

In box 509, the confirmation service 221 determines whether a confirmation 225 is received for the tentative relationship 233 or description. If a confirmation 225 is not received, the confirmation service 221 may discard the relationship 233. Thereafter, the operation of the confirmation service 221 ends. Otherwise, if a confirmation 225 is received, the confirmation service 221 may continue from box 509 to box 515 and mark the relationship 233 or description as being confirmed. The confirmation service 221 may also update the relationship 233 or description based upon user-supplied data such as a name 257 (FIG. 2) of the relationship 233 or description. It is noted that in some instances updates to the relationship 233 or description may require agreement of confirmations 225 for multiple users, under a crowdsourcing or untrusted approach. Thereafter, the operation of the confirmation service 221 ends.

Figure 6:
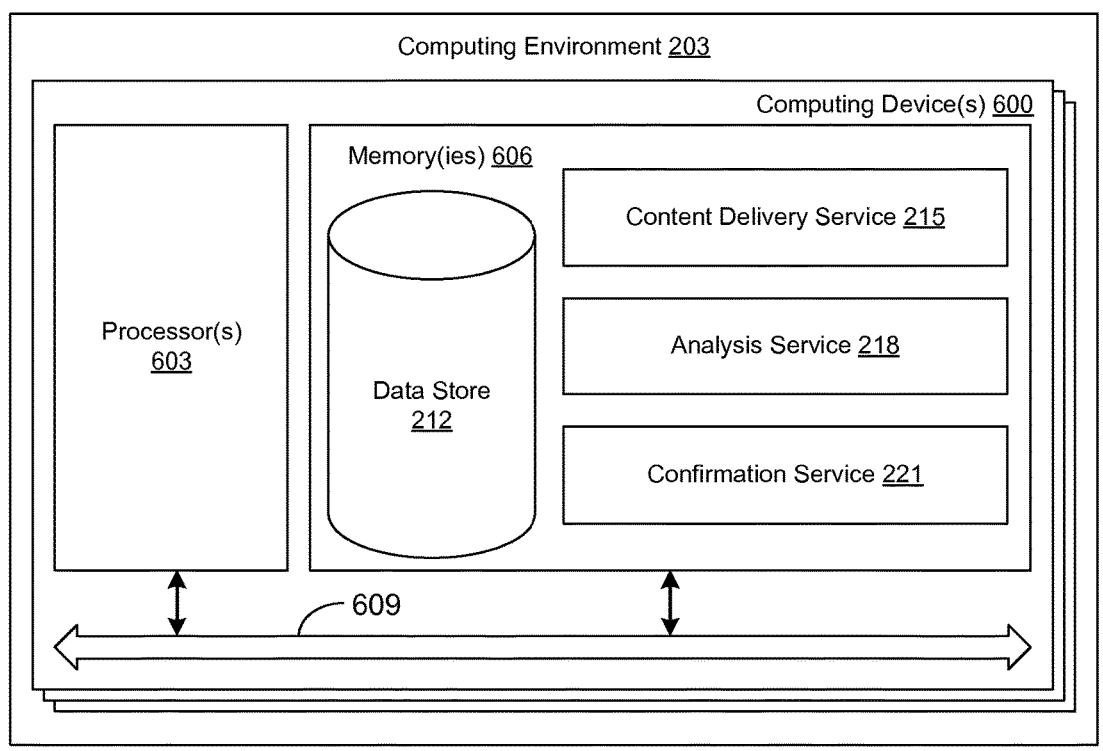
FIG. 6 is a schematic block diagram that provides one example illustration of a computing environment employed in the networked environment of FIG. 2 according to various embodiments of the present disclosure.

With reference to FIG. 6, shown is a schematic block diagram of the computing environment 203 according to an embodiment of the present disclosure. The computing environment 203 includes one or more computing devices 600. Each computing device 600 includes at least one processor circuit, for example, having a processor 603 and a memory 606, both of which are coupled to a local interface 609. To this end, each computing device 600 may comprise, for example, at least one server computer or like device. The local interface 609 may comprise, for example, a data bus with an accompanying address/control bus or other bus structure as can be appreciated.

Stored in the memory 606 are both data and several components that are executable by the processor 603. In particular, stored in the memory 606 and executable by the processor 603 are the content delivery service 215, the analysis service 218, the confirmation service 221, and potentially other applications. Also stored in the memory 606 may be a data store 212 and other data. In addition, an operating system may be stored in the memory 606 and executable by the processor 603.

It is understood that there may be other applications that are stored in the memory 606 and are executable by the processor 603 as can be appreciated. Where any component discussed herein is implemented in the form of software, any one of a number of programming languages may be employed such as, for example, C, C++, C#, Objective C, Java®, JavaScript®, Perl, PHP, Visual Basic®, Python®, Ruby, Flash®, or other programming languages.

A number of software components are stored in the memory 606 and are executable by the processor 603. In this respect, the term "executable" means a program file that is in a form that can ultimately be run by the processor 603. Examples of executable programs may be, for example, a compiled program that can be translated into machine code in a format that can be loaded into a random access portion of the memory 606 and run by the processor 603, source code that may be expressed in proper format such as object code that is capable of being loaded into a random access portion of the memory 606 and executed by the processor 603, or source code that may be interpreted by another executable program to generate instructions in a random access portion of the memory 606 to be executed by the processor 603, etc. An executable program may be stored in any portion or component of the memory 606 including, for example, random access memory (RAM), read-only memory (ROM), hard drive, solid-state drive, USB flash drive, memory card, optical disc such as compact disc (CD) or digital versatile disc (DVD), floppy disk, magnetic tape, or other memory components.

The memory 606 is defined herein as including both volatile and nonvolatile memory and data storage components. Volatile components are those that do not retain data values upon loss of power. Nonvolatile components are those that retain data upon a loss of power. Thus, the memory 606 may comprise, for example, random access memory (RAM), read-only memory (ROM), hard disk drives, solid-state drives, USB flash drives, memory cards accessed via a memory card reader, floppy disks accessed via an associated floppy disk drive, optical discs accessed via an optical disc drive, magnetic tapes accessed via an appropriate tape drive, and/or other memory components, or a combination of any two or more of these memory components. In addition, the RAM may comprise, for example, static random access memory (SRAM), dynamic random access memory (DRAM), or magnetic random access memory (MRAM) and other such devices. The ROM may comprise, for example, a programmable read-only memory (PROM), an erasable programmable read-only memory (EPROM), an electrically erasable programmable read-only memory (EEPROM), or other like memory device.

Also, the processor 603 may represent multiple processors 603 and/or multiple processor cores and the memory 606 may represent multiple memories 606 that operate in parallel processing circuits, respectively. In such a case, the local interface 609 may be an appropriate network that facilitates communication between any two of the multiple processors 603, between any processor 603 and any of the memories 606, or between any two of the memories 606, etc. The local interface 609 may comprise additional systems designed to coordinate this communication, including, for example, performing load balancing. The processor 603 may be of electrical or of some other available construction.

Although the content delivery service 215, the analysis service 218, the confirmation service 221, the content access application 266 (FIG. 2) and other various systems described herein may be embodied in software or code executed by general purpose hardware as discussed above, as an alternative the same may also be embodied in dedicated hardware or a combination of software/general purpose hardware and dedicated hardware. If embodied in dedicated hardware, each can be implemented as a circuit or state machine that employs any one of or a combination of a number of technologies. These technologies may include, but are not limited to, discrete logic circuits having logic gates for implementing various logic functions upon an application of one or more data signals, application specific integrated circuits (ASICs) having appropriate logic gates, field-programmable gate arrays (FPGAs), or other components, etc. Such technologies are generally well known by those skilled in the art and, consequently, are not described in detail herein.

The flowcharts of FIGS. 3-5 show the functionality and operation of an implementation of portions of the content delivery service 215, the analysis service 218, and the confirmation service 221. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor 603 in a computer system or other system. The machine code may be converted from the source code, etc. If embodied in hardware, each block may represent a circuit or a number of interconnected circuits to implement the specified logical function(s).

Although the flowcharts of FIGS. 3-5 show a specific order of execution, it is understood that the order of execution may differ from that which is depicted. For example, the order of execution of two or more blocks may be scrambled relative to the order shown. Also, two or more blocks shown in succession in FIGS. 3-5 may be executed concurrently or with partial concurrence. Further, in some embodiments, one or more of the blocks shown in FIGS. 3-5 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein, including the content delivery service 215, the analysis service 218, the confirmation service 221, and the content access application 266, that comprises software or code can be embodied in any non-transitory computer-readable medium for use by or in connection with an instruction execution system such as, for example, a processor 603 in a computer system or other system. In this sense, the logic may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

Further, any logic or application described herein, including the content delivery service 215, the analysis service 218, the confirmation service 221, and the content access application 266, may be implemented and structured in a variety of ways. For example, one or more applications described may be implemented as modules or components of a single application. Further, one or more applications described herein may be executed in shared or separate computing devices or a combination thereof. For example, a plurality of the applications described herein may execute in the same computing device 600, or in multiple computing devices in the same computing environment 203. Additionally, it is understood that terms such as "application," "service," "system," "engine," "module," and so on may be interchangeable and are not intended to be limiting.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

It should be emphasized that the above-described embodiments of the present disclosure are merely possible examples of implementations set forth for a clear understanding of the principles of the disclosure. Many variations and modifications may be made to the above-described embodiment(s) without departing substantially from the spirit and principles of the disclosure. All such modifications and variations are intended to be included herein within the scope of this disclosure and protected by the following claims.

Therefore, the following is claimed:

1. A non-transitory computer-readable medium embodying at least one program executable in at least one computing device to provide time-indexed character information for video content, wherein when executed the program causes the at least one computing device to at least:
analyze the video content to identify a plurality of characters that appear in the video content over an entirety of the video content, determine a frequency of appearance of a respective character, and determine a plurality of character descriptions for the respective character that are indexed by time in the video content, a respective one of the plurality of character descriptions being determined based at least in part on the frequency of appearance and natural language processing of verbal content associated with the respective character;
generate a user interface comprising a media player to play at least a period of time of the video content on a client device via the media player;
receive from the client device a first request for the time-indexed character information regarding a first character of the plurality of characters, the first request specifying at least the first character and a first time in the video content that is determined based at least in part on a portion of the video content that is played in the media player, wherein the first character is identified to appear in the portion of the video content;
identify a first character description of the plurality of character descriptions, wherein the first character description describes a first relationship between the first character and a second character of the plurality of characters based at least in part on the first time;
cause the user interface to present the first character description on the client device;
receive from the client device a second request for the time-indexed character information regarding the first character, the second request specifying at least the first character and a second time in the video content that is determined based at least in part on the portion of the video content that is played in the media player, the second time being after the first time;
identify a second character description of the plurality of character descriptions, wherein the second character description describes a second relationship between the first character and the second character based at least in part on the second time, wherein the second character description differs from the first character description based at least in part on a portion of the video content occurring between the first time and the second time; and
cause the user interface to present a second character description on the client device, wherein the time-indexed character information is provided by presentation of the first character description and the second character description.

2. The non-transitory computer-readable medium of claim 1, wherein at least one of the plurality of character descriptions corresponds to a character role in the video content.

3. A system to provide time-indexed information for media content, the system comprising:
at least one computing device; and
at least one application executed in the at least one computing device, wherein when executed the at least one application causes the at least one computing device to at least:
analyze media content to identify a plurality of entities that appear in the media content over an entirety of the media content, and determine the time-indexed information for at least a particular entity of the plurality of entities, the time-indexed information comprising an entity description for at least the particular entity being determined based at least in part on natural language processing of verbal content within the media content, wherein the time-indexed information changes over time in the media content;
generate a user interface to present at least a period of time of the media content from a first time to a second time in the media content on a client device;
receive, from the client device, a request for information regarding at least the particular entity of the plurality of entities in the media content, the request indicating at least the particular entity;
identify the time-indexed information that is indexed between the first time and the second time in the media content presented, wherein the entity description for at least the particular entity is identified to appear in the media content between the first time and the second time; and
cause the user interface to present the entity description for at least the particular entity on the client device to provide the time-indexed information for the media content.

4. The system of claim 3, wherein the at least one application when executed further causes the at least one computing device to at least obtain a verification from at least one user as to the time-indexed information.

5. The system of claim 4, wherein the at least one application when executed further causes the at least one computing device to at least select at least one user from a plurality of users based at least in part on a media consumption history of the at least one user with respect to the analyzed media content.

6. The system of claim 3, wherein the identification of the time-indexed information to be provided excludes other information based at least in part on a portion of the media content that occurs after the second time.

7. The system of claim 3, wherein the entity description is further determined based at least in part on a visual characteristic of at least one scene in which at least the particular entity appears.

8. The system of claim 3, wherein the media content is divided into a plurality of scenes, and the entity description is further determined based at least in part on a respective location of individual ones of the plurality of scenes.

9. The system of claim 3, wherein the entity description is further determined based at least in part on a type of music that accompanies an appearance of the at least one of the plurality of entities in the media content.

10. The system of claim 3, wherein the media content corresponds to an episode of a series, and the entity description is further determined based at least in part on analyzing other media content corresponding to another episode in the series.

11. The system of claim 3, wherein the at least one application when executed further causes the at least one computing device to at least:
   determine a confidence score of the time-indexed information that is inferred;
   compare the confidence score of the time-indexed information to a threshold; and
   obtain a verification from at least one user as to the time-indexed information based at least in part on the comparison of the confidence score to the threshold.

12. A method to provide time-indexed information, the method comprising:
   analyzing, by at least one service executed in at least one computing device, media content to identify a plurality of entities that appear in the media content over an entirety of the media content, and determine the time-indexed information comprising a tentative entity description of a plurality of tentative entity descriptions for a particular entity of the plurality of entities based at least in part on natural language processing of verbal content within the media content;
   identifying, by the at least one service executed in the at least one computing device, at least one user from a plurality of users based at least in part on a respective media consumption history associated with individual ones of the plurality of users;
   generating, by the at least one service executed in the at least one computing device, a user interface to present at least a portion of the media content from a first time to a second time in the media content to the at least one user on a client device;
   determining, by the at least one service executed in the at least one computing device, the tentative entity description of the plurality of tentative entity descriptions that is indexed between the first time and the second time in the media content; and
   causing, by the at least one service executed in the at least one computing device, the user interface to present the tentative entity description on the client device for confirmation by the at least one user.

13. The method of claim 12, wherein the respective consumption history includes consumed feature information specifying features of the media content that have been consumed by the individual ones of the plurality of users, and the identifying further comprises identifying the at least one user based at least in part on the consumed feature information.

14. The method of claim 12, wherein the identifying is further based at least on ratings of the media content associated with the individual ones of the plurality of users.

15. The method of claim 12, wherein the identifying is further based at least on reliability of relationship confirmations associated with the individual ones of the plurality of users.

16. The system of claim 4, wherein the at least one application when executed further causes the at least one computing device to at least qualify the at least one user to provide the verification based at least in part on a level of knowledge of the at least one user demonstrated with respect to a particular type of media content.

17. The method of claim 12, wherein the respective media consumption history is associated with the media content.

18. The method of claim 12, further comprising:
   receiving, by the at least one service executed in the at least one computing device, a request from another client device for entity information regarding the particular entity relative to a particular time in the media content, the request indicating at least the particular entity and the particular time;
   identifying, by the at least one service executed in the at least one computing device, based at least in part on the particular time indicated in the request; and
   sending, by the at least one service executed in the at least one computing device, the entity information to the another client device, wherein the entity information is based at least in part on the tentative entity description.

19. The method of claim 12, further comprising receiving, by the at least one service executed in the at least one computing device, a confirmation of the tentative entity description from the client device associated with the at least one user.

20. The method of claim 19, wherein receiving the confirmation further comprises receiving, by the at least one service executed in the at least one computing device, a user-specified textual description describing the tentative entity description from the client device.

* * * * *